(12) United States Patent
Hoover

(10) Patent No.: US 7,819,238 B2
(45) Date of Patent: Oct. 26, 2010

(54) HEAVY DUTY SLIDE

(75) Inventor: Harold D. Hoover, Sterling Hts., MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 11/248,089

(22) Filed: Oct. 12, 2005

(65) Prior Publication Data
US 2007/0080046 A1    Apr. 12, 2007

(51) Int. Cl.
*B23Q 1/58* (2006.01)
(52) U.S. Cl. ............... 198/621.1; 198/860.1; 198/750.1
(58) Field of Classification Search .............. 198/621.1, 198/620, 750.2; 384/55
See application file for complete search history.

(56) References Cited

U.S. PATENT DOCUMENTS 2,330,154 A * 9/1943 Stabinski ...................... 384/55
3,431,768 A * 3/1969 Kull et al. ...................... 72/419
3,993,206 A   11/1976 Jomen et al.
4,799,175 A * 1/1989 Sano et al. ................... 382/151
4,829,880 A   5/1989 Lieberman
4,898,080 A   2/1990 Lieberman
5,568,982 A * 10/1996 Stoll et al. ...................... 384/55
5,588,962 A * 12/1996 Nicholas et al. ............. 604/507
5,915,916 A * 6/1999 Saji .......................... 414/749.1
5,950,790 A   9/1999 Barber
6,098,521 A * 8/2000 Iida ............................... 92/88
6,409,438 B1   6/2002 Kohler
6,481,334 B1   11/2002 Kaneko

* cited by examiner

*Primary Examiner*—Gene Crawford
*Assistant Examiner*—Kavel P Singh
(74) *Attorney, Agent, or Firm*—Harness, Dickey & Pierce, P.L.C.

(57) ABSTRACT

A heavy duty slide for use in a manufacturing environment. The heavy duty slide includes a base and a rail support secured to the base. The heavy duty slide also has an inverted rail arranged on a bottom surface of the rail support. A removable bearing system is arranged on the inverted rail and a carriage plate is secured to the removable bearing system.

20 Claims, 3 Drawing Sheets

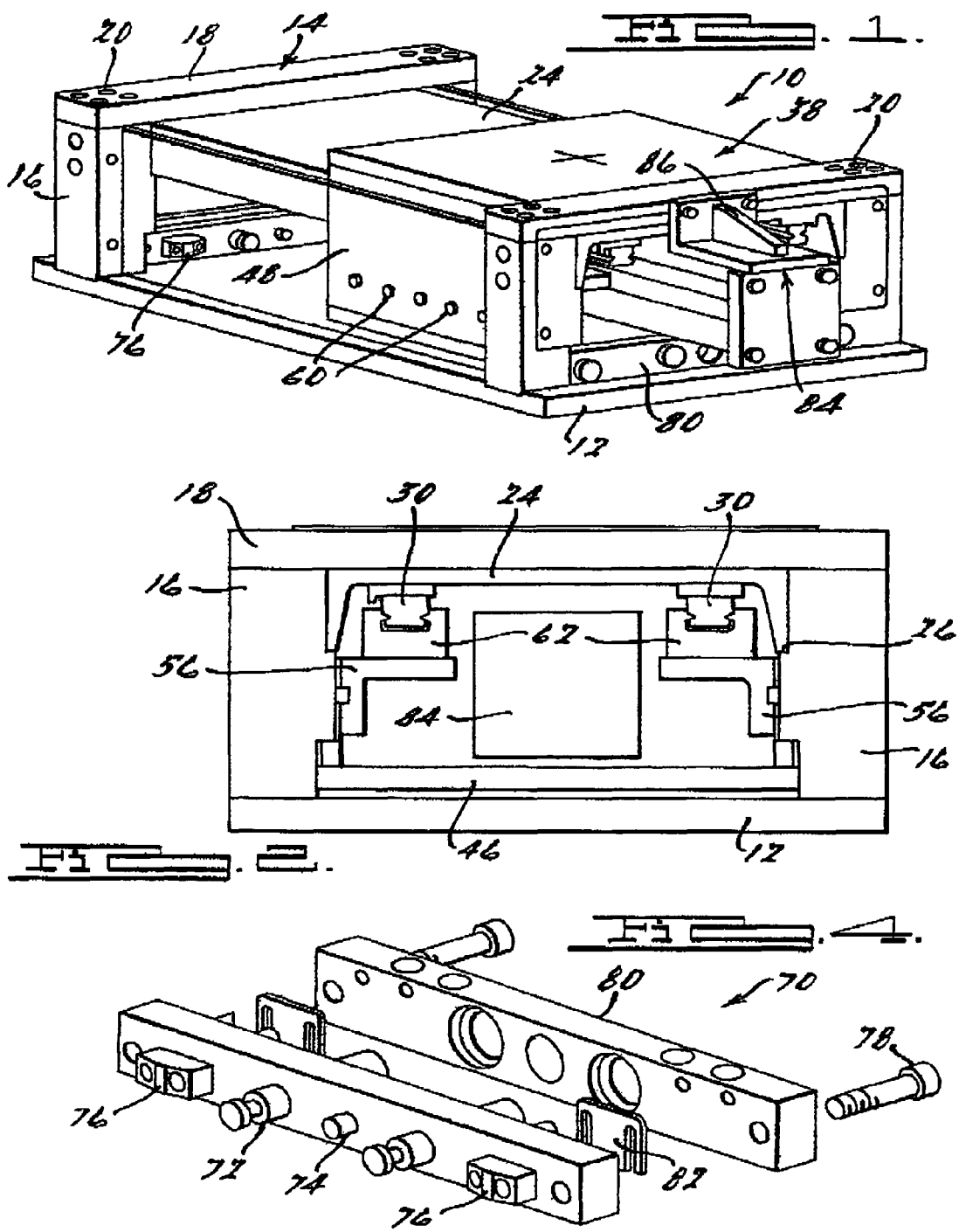

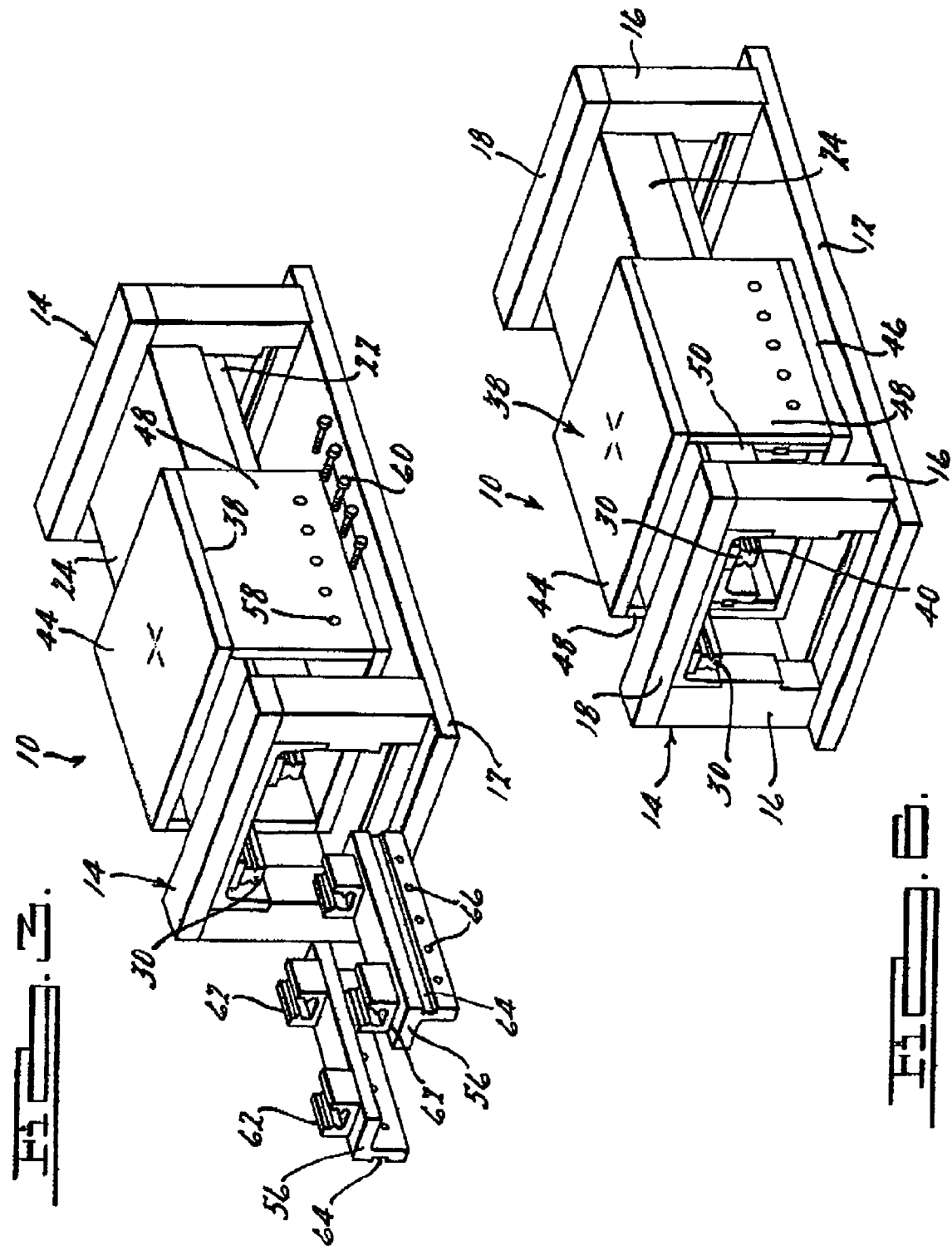

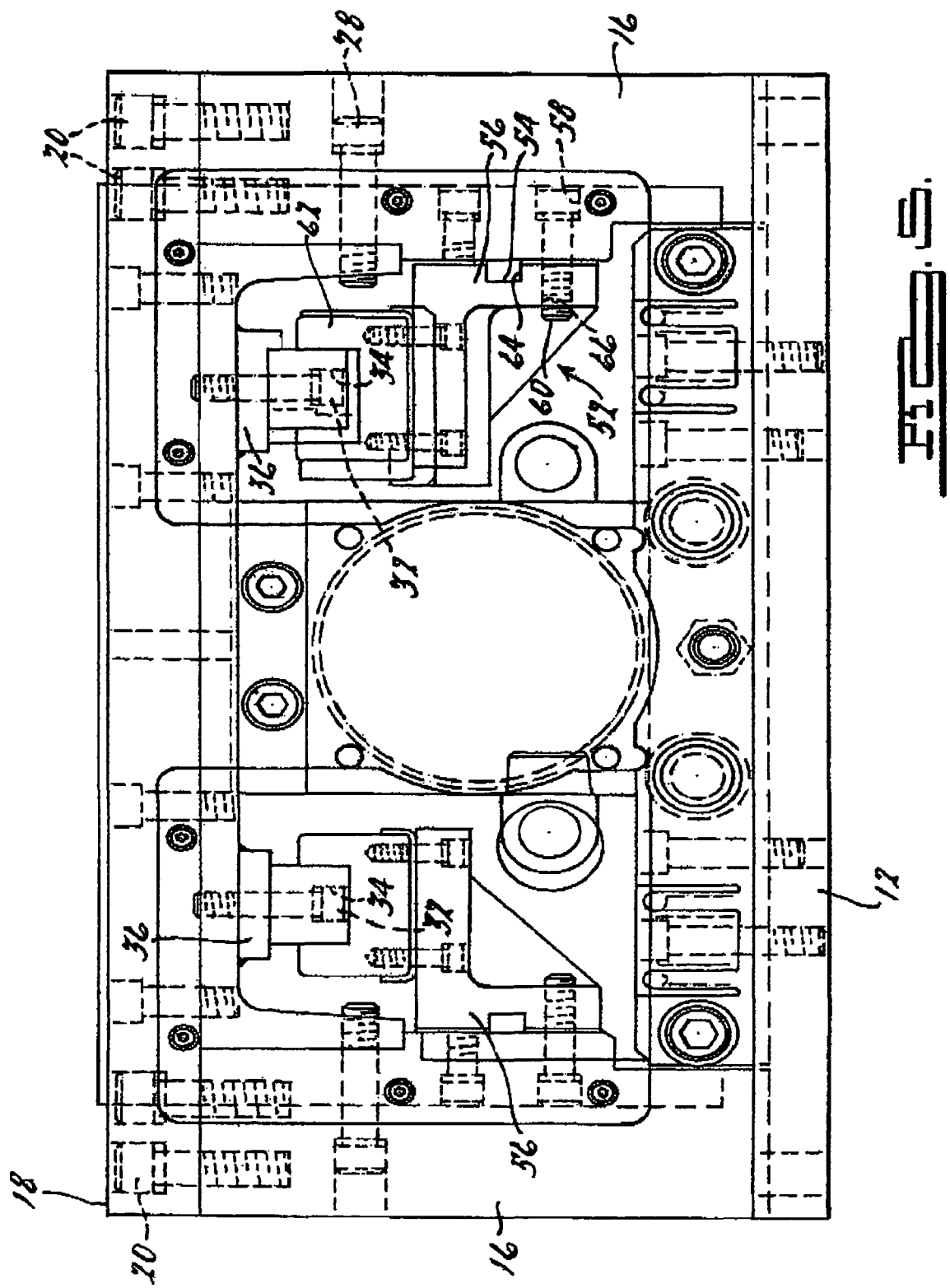

HEAVY DUTY SLIDE

BACKGROUND OF THE INVENTION

1. Field of the Invention

The present invention generally relates to heavy duty slides, and more particularly relates to heavy duty weld slides for holding work pieces or tooling in manufacturing environments.

2. Description of Related Art

Heavy duty slides have been known for many years in the art. Many of these slides have been used along assembly lines for moving parts into predetermined positions. The prior art slides include a moveable carriage that carries the part to a desired point or position on the assembly line. Generally, a pick up device is attached to the carriage and this device picks up the part from the carriage and moves it to the precise location along the assembly line or a work piece is connected to the carriage and the carriage is placed at a predetermined position such that a welding action or other action may be performed on the work piece in the assembly line of the manufacturing environment. Generally, these prior art slides are fluid powered and include a hydraulic pneumatic cylinder which in response to fluid pressure moves the carriage first in one direction along its path of travel and then the opposite direction along the same path of travel when moving between multiple predetermined positions.

Many of the prior art power slides include rods that have a system of bellows or telescoping covers to protect the rods from contaminates such as weld slag or the like found in the manufacturing environment. These prior art slides generally require labor intensive maintenance to replace or repair bearings and/or remove weld slag from key components during the operational lifecycle of the prior art heavy duty slides. Many of the prior art heavy duty slides require shut down of the manufacturing line to maintain the slides to ensure a repeatability that is within tolerances of manufacturers standards on the manufacturing lines.

Therefore, there is a need in the art for an improved heavy duty slide for use in a manufacturing environment. There is also a need in the art for a heavy duty slide that has removable bearings that does not require removal of tooling from the carriage plate or the sliding plate of a heavy duty slide to replace, maintain or repair bearings in a manufacturing environment. There is also a need in the art for a heavy duty slide that has inverted rails that will prevent contamination of the rails and provide repeatable positioning for a predetermined number of cycles in the manufacturing environment. There is also a need in the art for a heavy duty slide that can use larger bearings in the range of 45 mm to 55 mm for heavier loads while still having a reliable maintenance free design that will prevent weld contamination and increase proficiency and durability of the manufacturing line by reducing down time of the line for cleaning and the like. There is also a need in the art for a heavy duty slide that has an integrated shock sensor system that does not require multiple adjustments after initial shimming of the integrated shock sensor system into the slide unit.

SUMMARY OF THE INVENTION

One object of the present invention may be to provide an improved heavy duty slide.

Another object of the present invention may be to provide a heavy duty slide that has removable bearings.

Still another object of the present invention may be to provide a heavy duty slide with a cylinder arranged inside of the slide to provide a compact footprint.

Still a further object of the present invention may be to provide an integrated shock sensor system for use in a heavy duty slide.

Still another object of the present invention may be to provide inverted rails to protect the bearing system from contamination in the heavy duty slide manufacturing environment.

Still another object of the present invention may be to provide the use of larger bearings which will allow for heavier loads on the heavy duty slide according to the present invention.

To achieve the foregoing objects, a heavy duty slide for use in a manufacturing environment is disclosed. The heavy duty slide includes a base and a rail support secured to the base. The slide also includes an inverted rail arranged on the bottom surface of the rail support and a removable bearing system arranged on the inverted rail. The heavy duty slide also includes a carriage plate secured to the removable bearing system.

One advantage of the present invention is that it may provide an improved heavy duty slide.

Another advantage of the present invention is that it may provide a heavy duty slide that has removable bearings that are removable without removing tooling from a carriage plate.

Still another advantage of the present invention is that it may provide a heavy duty slide that has a cylinder mounted inside of the slide to provide a compact footprint and to protect the cylinder from contaminates.

Yet another advantage of the present invention is that it may provide a heavy duty slide that includes a shock sensor system that integrates a shock, sensor and stop in one unit.

Still another advantage of the present invention is that it may provide a heavy duty slide that has inverted rails that will protect the bearing system from contamination and remove the use of flexible bellows or guards therefrom.

Still another advantage of the present invention is that it may provide a heavy duty slide that may use bigger bearings that will allow for heavier loads for use in a manufacturing environment.

Other objects, features and advantages of the present invention will become apparent from the subsequent description and appended claims taken in conjunction with the accompanying drawings.

BRIEF DESCRIPTION OF THE DRAWINGS

FIG. 1 shows a heavy duty slide according to the present invention.

FIG. 2 shows an end view of a heavy duty slide according to the present invention.

FIG. 3 shows a heavy duty slide with the removable bearings removed according to the present invention.

FIG. 4 shows the shock sensor system used in the heavy duty slide according to the present invention.

FIG. 5 shows a phantom end view of the heavy duty slide according to the present invention.

FIG. 6 shows a heavy duty slide with parts removed for clarity according to the present invention.

DESCRIPTION OF THE EMBODIMENT(S)

According to the drawings, a heavy duty slide 10 according to the present invention is shown. The heavy duty slide 10 is generally used as a work holding device and is used in manufacturing environments such as those that use welders, robots, other tools or any known manufacturing environment. The heavy duty slide 10 will be capable of moving a work piece in a linear motion to precise predetermined positions within plus or minus 0.05 millimeters thus allowing for precise manufacturing work to be done by robotic welders, robotic tools, or any other known tools in the manufacturing environment. The heavy duty slide 10 according to the present invention may be mounted in any orientation and used in any known manufacturing environment. The heavy duty slide 10 has a simple maintenance free design that includes an inverted bearing system and rail system that will prevent weld contamination and other environmental contamination from the manufacturing environment from contaminating the weld slide unit rail system and stopping or reducing the effectiveness of the sliding during high volume manufacturing use. The heavy duty slide 10 according to the present invention, also has a highly repeatably positioning mechanism that is capable of operating for millions of cycles including those with hard stops to repeatability of approximately plus or minus 0.05 millimeters. This will allow for precise location and holding of the work piece or tooling within the manufacturing environment. The heavy duty slide 10 also eliminates the use of bellows and telescoping covers that were used in many prior art heavy duty slides to protect the rail systems and were cumbersome and involved high maintenance and had durability issues. It is contemplated that the heavy duty slide 10 can be used in any known manufacturing system including but not limited to, framing systems, body side rolling systems, quarter panel subassembly fixture systems, door assembly systems, underbody systems, appliance welding and assembly systems, component loading and unloading systems, automatic assembly and testing systems, and any other known manufacturing line or system.

The heavy duty slide 10 includes a base 12 that generally has a rectangular shape. The base 12 is generally made of a steel however, any other plastic, metal, ceramic, composite, etc., material may also be used to create the base 12. The base 12 will be either connected to a table top or to a floor in a manufacturing environment and will include a plurality of orifices therethrough to allow for connection of the base 12 to other heavy duty slide components. It should be noted that any other shape base 12 may be used depending on the design requirements and environment of the manufacturing line in which the heavy duty slide 10 will be used.

A rail support 14 is secured to the base 12 on or near each end thereof. In the embodiment shown the rail support 14 is secured to a top surface of the base 12 a predetermined distance from the end of the base 12. The rail support 14 is secured to each end of the top surface of the base 12. The rail support 14 includes a first and second leg 16 connected by a top portion 18. The rail support 14 generally has a U-shape and is fastened to the top portion of the base 12 via any known fastener. It should be noted that the rail support 14 is even contemplated to be molded directly into the top of the base 12 or may be machined into the top of the base 12 or connected via any known fastener such as bolts, screws, welding or any other type of chemical bonding technique. The U-shaped rail supports 14 will generally have a predetermined sized passage between the top portion 18 of the rail support 14 and the top surface of the base 12. This passage generally will have a rectangular shape when viewed from an end. The rail support 14 will have a plurality of orifices or cavities therein some of which are threaded and some of which are not that will be used to connect various features of the heavy duty slide 10 thereto. In the embodiment shown in the drawings, a plurality of fasteners 20 are used to connect the top portion 18 of the rail support 14 to the first and second legs 16 of the rail support 14. Any known fastener can be used to connect the top portion 18 of to the first and second legs 16. It is even contemplated to have a T-slot arrangement in the base 12 with the legs 16 of the rail support 14 sliding into the T-slot to ensure for proper alignment and location of the rail supports 14 with respect to the base 12. The legs 16 of the rail support 14 may include indentations and shoulders on an inner surface thereof to allow for insertion of other components into the heavy duty slide 10.

An inverted rail system 22 is arranged between the rail supports 14 located on the base 12. The inverted rail system 22 includes a frame 24 secured to a bottom surface of the top portion 18 of the rail supports 14 and arranged within a shoulder 26 of the inner surface of the legs 16 of the rail support 14. The frame 24 generally has a U-shaped cross section and extends the entire length between the first and second rail supports 14 of the heavy duty slide 10. A plurality of fasteners 28 are passed through the rail support 14 into the frame 24 to secure the frame 24 to each of the rail supports 14 of the heavy duty slide 10. It should be noted that all of the components described for the heavy duty slide 10 are generally made of a steel material, however any other metal, plastic, ceramic, composite, or the like may be used for any of the components described above or hereafter.

The inverted rail system 22 also includes a first and second rail 30 secured to a bottom surface of the frame 24 for the heavy duty slide 10. The first and second rail 30 extend along the entire length of the frame 24 and are secured to the bottom surface of the frame 24 by any known fastener 32. The frame 24 will have a plurality of cavities therein that will receive the fasteners 32 that pass through an orifice 34 of the rails 30. The rails 30 generally have a square like cross section with a base 36 on one side thereof, wherein the base 36 engages the bottom surface of the frame 24 when the rails 30 are connected to the frame 24 for operational use. The rails 30 are arranged at a predetermined distance from one another on the bottom surface of the frame 24. This will ensure that the carriage plate 38 will slidingly move in a length wise direction across the frames 24 top surface between the first and second rail supports 14. The rails 30 may include a groove or channel 40 along an entire surface thereof to interact with the bearings 42 of the heavy duty slide 10. Hence, the frame 24 will provide a protective covering to the rail system 22 by blocking all contaminates including weld slag from contaminating the rails 30 which are inverted on the bottom surface and secured to the bottom surface of the frame 24, i.e., the rails 30 face the top surface of the base 12. The U-shaped cross section frame 24 will protect the weld contaminates from hitting the rails 30 from a top direction and from the side based on the unique shape of the frame 24. It is also contemplated for the frame 24 to have raised surfaces onto which the rails 30 will be secured and it is even contemplated to have an aligning shoulder up on which the rails 30 will come in contact with to ensure for proper alignment of the rails 30 with respect to the frame 24 within the heavy duty slide 10.

The heavy duty slide 10 also includes a carriage plate 38 which generally has a top and bottom portion 44, 46 with a first and second side wall 48 arranged therebetween. The carriage plate 38 generally has a rectangular cross section, the side walls 48 have a groove 50 cut out of a top portion thereof wherein the groove 50 will receive the sides of the frame 24 and will allow the sides of the frame 24 to slide along the groove 50 of the inner surface of the walls 46 of the carriage plate 38. The carriage plate 38 may have a plurality of orifices therethrough to allow for connection of the top and bottom portions 44, 46 of the carriage plate 38 to the side walls 48 and of the bearing system 52 to the carriage plate 38 inner surface. The top and bottom portions 44, 46 may also be connected to the walls 48 by welding or any other fastening technique. The carriage plate 38 inner surface will also include a rib 54 extending from an inner surface thereof that runs along the entire length of the inner walls 48 of the carriage plate 38. The rib 54 will generally have a predetermined shape such as a rectangular shape, that will mimic that of a shape on a bracket 56 of the bearing system 52. A plurality of orifices 58 are arranged through each of the walls 48 of the carriage plate 38. These orifices 58 will allow for fasteners 60 to be passed through the walls 48 from an outer side thereof and interact with the bearing system 52 of the heavy duty slide 10. In the embodiment shown, five orifices 58 are used to connect the bearing system 52 to the inner walls of the carriage plate 38. However, any other number of orifices 58 may be used to connect via any known fastener the bearing system 52 to the inner walls of the carriage plate 38 or any other type of fastening mechanism may be used to connect the bearing system 52 to the inner walls of the carriage plate 38. The carriage plate 38 is capable of sliding along the entire length of the heavy duty slide frame 24 between the first and second rail supports 14. This will allow for the movement of a work piece being worked on in the manufacturing environment to be placed at a predetermined positions between the rail supports 14. It is contemplated to have a stroke length for the carriage plate 38 from approximately 25 millimeters up to a 500 millimeter stroke depending on the design requirements and manufacturing environment for the heavy duty slide 10.

The heavy duty slide 10 also includes a removable bearing system 52 that will allow for easy replacement of the bearings 62 without removing tooling from the top of the carriage plate 38 and also allows for easy maintenance and repair of the bearing system 52 without shutting down the line or labor intensive activities by operators of the manufacturing line. The bearing system 52 includes a bracket 56 which is secured to the carriage plate 38 via any known fasteners 60. The bracket 56 generally has an L-shape and is approximately the length of the side wall 48 of the carriage plate 38. The bracket 56 includes a groove 64 in one outside surface thereof that will interact with and mate with the rib 54 on the inner surface of the wall 48 of the carriage plate 38 thus allowing for proper alignment and help in supporting the bracket 56 within the carriage plate 38. The bracket 56 will also include a plurality of orifices 66 that are threaded that will mate with and align with the orifices in the side wall 48 of the carriage plate 38 and allow for a fastener 60 to be placed therethrough to secure the bracket 56 to the inner side wall 48 with the groove 64 of the bracket 56 arranged over the rib 54 of the side wall 48 of the carriage plate 38. This will ensure secure placement of the bracket 56 within the carriage plate 38. The fasteners 60 being installed from the outer surface of the carriage plate 38 will allow for easy maintenance and removal of the bearing system 52 by maintenance workers on the manufacturing line.

The bearing system 52 also includes a plurality of removable bearings 62 secured to an outer surface of the bracket 56. In the embodiment shown two bearings 62 will be secured to each bracket 56. However, it should be noted that at least one bearing 62 has to be secured to each bracket 56 and that any number of bearings 62 may be secured to each bracket 56 depending on the design requirements of the heavy duty slide 10. The bearings 62 will be secured via any known fastener to the top surface of the bracket 56. These bearings 62 are arranged such that they will align with the rails 30 secured to the bottom portion of the frame 24 when the bracket 56 is secured to the inner wall of the carriage plate 38. The bearings 62 will allow for the lengthwise sliding movement of the carriage plate 38 with relation to the frame 24 of the heavy duty slide 10. It should be noted that any known bearing, such as a ball bearing 62, or any other known bearing may be used for the present invention depending on the design requirements and manufacturing environment. The bearing system 52 will be able to be maintained and replaced or repaired without having to remove tooling or a work piece connected to the top surface of the carriage plate 38 in the manufacturing environment. Many of the prior art systems had to have the work piece or tooling removed from its carriage plate to allow the operator to remove the bearings, replace the bearings, or maintain the bearings. The bearing system 52 of the present invention also will allow for different size bearings to be used on the brackets 56, including larger sized bearings to allow for the heavy duty slide 10 to be used with a variety of heavy work pieces or tooling depending on the design requirements of the manufacturing line. This will ensure that the heavy duty slide 10 is compatible with flexible manufacturing lines now becoming the norm in the manufacturing industry. Therefore, during operation the bearings 62 located on the top of the bracket 56 will engage with the rail 30 of the heavy duty slide and allow for the carriage plate 38 to move in a linear motion between the first and second rail 14 support to predetermined positions along the stroke length of the heavy duty slide 10.

The heavy duty slide 10 also includes a shock sensor system 79 arranged in at least one of the rail supports 14. The shock sensor system 70 includes an integrated shock, sensor and stopper mechanism. This mechanism includes a shock absorber 72, a proximity sensor 74 and a stop member 76 all integrated into one single unit. The shock absorbers 72 will extend a predetermined distance from an outer surface thereof while the stop members 76 will extend a predetermined distance from the outer surface thereof. A sensor 74 will be arranged near a middle thereof to allow for sensing of where the carriage 38 is in relation to the rail support 14 in which the integrated shock sensor system 70 is arranged. The integrated shock sensor system 70 generally is arranged between the legs 16 of one or both of the rail supports 14 on or near the top surface of the base 12. Any known fastener 78 is used to connect the integrated shock sensor system 70 to a plate 80 that is secured to the rail support 14 at a bottom surface thereof. The integrated shock sensor system 70 will reduce field set up time and reduce and remove the need to reset the sensor 74 and shock absorbers 72 after shim 82 adjustments have been made during set up of the heavy duty slide 10. Standard shim packages 82 and stops will be arranged between the integrated shock sensor and the bracket 80 which is secured to the rail support 14 to allow for a precise distance between the sensor 74 and the carriage plate 38, when the plate 38 is in the fully slid position or stopped position relating to a rail support 14.

The heavy duty slide 10 may include a cylinder 84 that will be mounted at least partially inside one of the rail supports 14 and be protected from contamination by the frame 24 of the heavy duty slide 10. The cylinder 84 in one embodiment is a standard pneumatic actuator but any other type of hydraulic, electric, or mechanical actuator may be used. The cylinder 84 will provide point to point single access indexing of the carriage plate 38 with a highly repeatable action. This repeatability will approach approximately plus or minus 0.05 millimeters, with hard stops, in its accuracy to locate a predetermined position for the manufacturing environment. With the cylinder 84 partially mounted within the heavy duty slide 10 it will increase the robustness and duty cycle time of the heavy duty slide 10 in the manufacturing environment. The cylinder 84 will be connected via any known bracket 86 to the outer surface of one of the rail supports 14. The other side of the bracket 86 will be connected to the cylinder 84 and will allow for operation of the heavy duty slide 10 in small places which is provided by the cylinder 84 generally being mounted within the heavy duty slide 10 which will provide a compact foot print for the heavy duty slide 10. Any known cylinder 84 can be used with the heavy duty slide 10.

It should be noted that the bearing system 52 is a sealed self lubricating bearing system that will provide for long life and low maintenance of the bearings 62 during the life of the heavy duty slide 10. It is also contemplated to have a manual lock out safety and maintenance option that will allow for locking out of the heavy duty slide 10 during maintenance thereon. The heavy duty slide 10 also has a robust and heavy duty structure that is capable of capacities up to 3000 pounds or 1350 kilograms depending on the design requirements of the heavy duty slide 10. It is also contemplated to have standard frame 24 lengths that will provide a common tooling solution in pre-engineered packaging that will save time and money in the set up and operation of the heavy duty slides 10 in the manufacturing environment.

The open end design of the heavy duty slide 10 will allow for bearing system replacement without removing tooling from the top of the carriage plate 38. This will also reduce operational expenses by making it easier to maintain and repair the heavy duty slide 10. The high repeatability of the heavy duty slide 10 will ensure for precise manufacturing actions to be taken on the work piece being processed. It should be noted that all of the shapes described above for all of the components are for only one contemplated embodiment, but that any other known shape or dimension, such as length, width, etc., may be used to create heavy duty slides 10 of varying sizes and varying capacities depending on the design requirements and the manufacturing environment within which the heavy duty slide 10 will be used. It is contemplated in one embodiment to have removable bearings 62 that may be large in size such as those from approximately 35 millimeters up to 55 millimeter to allow for heavier loads to be used within the manufacturing environment on the heavy duty slide 10. Any type of tooling or work piece can be connected to the top portion of the carriage plate 38 via the orifices or slots through the carriage plate 38 depending on the design requirements of the manufacturing environment.

The present invention has been described in an illustrate manner, it is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A heavy duty slide, said slide including:
    a rail support positioned over top of a surface of a base, said rail support including a top portion spaced from and positioned over top of the surface of the base, said top portion having a bottom surface spaced from and opposing the surface of the base such that a gap is formed between said top portion bottom surface and the surface;
    an inverted rail coupled with said rail support and suspended into said gap from the bottom surface of the top portion of said rail support extending toward the surface of the base;
    a removable bearing system slidingly engaged with said inverted rail; and
    a carriage plate secured to said removable bearing system, said bearing system capable of being replaced or repaired without removing tooling or a workpiece from said carriage plate.

2. The slide of claim 1 wherein said inverted rail includes a frame secured to said rail support by at least one fastener.

3. The slide of claim 1 wherein said inverted rail is protected by said frame.

4. The slide of claim 1 wherein said removable bearing system having a bracket and at least one removable bearing secured to a surface of said bracket.

5. The slide of claim 4 wherein said bracket is secured to said carriage plate.

6. The slide of claim 5 wherein said bracket having a groove on one surface thereof.

7. The slide of claim 6 wherein said carriage plate having a rib extending from a surface there of, said carriage plate having a top and bottom portion and a first and second side wall arranged between said top and said bottom portion, said carriage plate having a generally rectangular cross section.

8. The slide of claim 7 wherein said groove interacts with said rib when said bracket is secured to said carriage plate, said bracket is secured to an inside surface of one of said side walls.

9. The slide of claim 1 further including a cylinder secured to said rail support.

10. The slide of claim 1 further including a shock sensor system secured to said rail support.

11. The slide of claim 9 wherein said cylinder is arranged inside said rail support.

12. A heavy duty slide, said slide including;
    a rail support positioned over top of a surface of a base;
    an inverted rail secured on a bottom surface of a top portion of said rail support;
    a removable bearing system slidingly engaged with said inverted rail, said removable bearing system having a bracket and at least one removable bearing secured to a surface of said bracket, said bearing having a size between 35 mm and 65 mm; and
    a carriage plate secured to said removable bearing system, said bearing system capable of being replaced or repaired without removing tooling or a workpiece from said carriage plate.

13. A slide for use in a manufacturing environment, said slide including:
    a first rail support, said first rail support having a first leg, a second leg and a top member arranged between said legs;
    a second rail support spaced from said first rail support, said second rail support having a first leg, a second leg and a top member arranged between said legs;
    a gap is formed between the top members, legs and a surface of a base;
    a frame arranged between and in contact with said first and second rail support, said frame in said gap spaced from and suspended over the surface of the base;
    at least one rail secured to and suspended underneath said frame on a bottom surface of said frame such that the at least one rail is in said gap between said frame and surface of the base extending toward the surface of the base;
    a carriage plate slidingly arranged over said frame and between said first and second rail support;
    a bracket secured to said carriage plate; and
    at least one removable bearing contacting said bracket and said rail.

14. The slide of claim 13 further including a cylinder secured to said first rail support.

15. The slide of claim 13 further including a shock sensor system arranged in at least one of said rail supports.

16. The side of claim 13 wherein said rail is inverted as a bottom portion of said frame, said inverted rail is protected from contamination in the manufacturing environment.

17. The slide of claim 13 wherein said bracket having a groove in a surface and said carriage plate having a rib on a surface, said groove interacts with said rib to align and partially support said bracket within said carriage plate, said carriage plate having a top and bottom portion and a first and second side wall arranged therebetween.

18. The slide of claim 13 wherein said bracket is removable without removing tooling from said carriage plate by an open end of one of said guide rails.

19. The slide of claim 15 wherein said shock sensor system integrates a shock absorber, a proximity sensor and a stop mechanism into one unit, said shock sensor system after initial shimming operates without need for resetting said sensor and said shock absorber.

20. The slide of claim 13 wherein said carriage plate slides over said frame with a high repeatability to approximately plus or minus 0.05 mm.

\* \* \* \* \*